(12) United States Patent
Bobst et al.

(10) Patent No.: US 12,370,626 B2
(45) Date of Patent: Jul. 29, 2025

(54) MACHINING DEVICE WITH A MEASURING SYSTEM

(71) Applicant: Agathon AG, Maschinenfabrik, Bellach (CH)

(72) Inventors: Christian Bobst, Kestenholz (CH); Thomas Ackermann, Kestenholz (CH); Josquin Pfaff, Zürich (CH)

(73) Assignee: Agathon AG, Maschinenfabrik, Bellach (CH)

( * ) Notice: Subject to any disclaimer, the term of this patent is extended or adjusted under 35 U.S.C. 154(b) by 0 days.

(21) Appl. No.: 18/932,909

(22) Filed: Oct. 31, 2024

(65) Prior Publication Data

US 2025/0135579 A1    May 1, 2025

(30) Foreign Application Priority Data

Oct. 31, 2023    (EP) ..................... 23206896

(51) Int. Cl.
- *B23K 26/08*    (2014.01)
- *B23H 7/26*    (2006.01)

(Continued)

(52) U.S. Cl.
CPC .......... *B23K 26/0876* (2013.01); *B23H 7/26* (2013.01); *B24B 51/00* (2013.01)

(58) Field of Classification Search
None
See application file for complete search history.

(56) References Cited

U.S. PATENT DOCUMENTS

| | | | | |
|---|---|---|---|---|
| 2009/0263199 A1* | 10/2009 | Wang | ..................... | B23Q 15/22 408/124 |
| 2013/0263199 A1* | 10/2013 | Iwasaki | ................ | H04N 19/172 725/115 |

FOREIGN PATENT DOCUMENTS

| | | | |
|---|---|---|---|
| CN | 115055814 A | * | 9/2022 |
| DE | 4301214 | | 8/1993 |

(Continued)

OTHER PUBLICATIONS

Machine translation of RU-2336164-C1, Dec. 2024 (Year: 2024).*

(Continued)

*Primary Examiner* — Geoffrey S Evans

(74) *Attorney, Agent, or Firm* — Tucker Ellis LLP

(57) ABSTRACT

A machining device is provided with multiple translational and/or rotary machine axes for laser processing, grinding or electrical discharge machining of a workpiece into a tool. The machining device includes a machining unit comprising either a laser system with an optical system for generating, directing and/or moving a laser beam along an optical axis, a grinding tool rotatable around a tool axis, or an electrode tool for generating electrical discharge. The machining device also includes a workpiece support on which the workpiece is attached. The workpiece support is arranged movable about a second rotary machine axis, which is movable relative to a first rotary machine axis, perpendicular to the second rotary machine axis. A measuring system is positioned in a center of the first rotary machine axis and orientated towards a machine zero point defined by an intersection of the first rotary machine axis and the second rotary machine axis. The measurement system is configured to perform measurements along a first measurement axis and/or a second measurement axis to determine measurement data. A control unit is configured to control the machining unit and/or the measuring system.

13 Claims, 4 Drawing Sheets

(51) Int. Cl.
*B23Q 17/00* (2006.01)
*B24B 51/00* (2006.01)

(56) References Cited

FOREIGN PATENT DOCUMENTS

| | | |
|---|---|---|
| DE | 102012110673 | 5/2014 |
| EP | 2915622 | 9/2015 |
| EP | 4070915 | 10/2022 |
| JP | 2013215830 A * | 10/2013 |
| RU | 2336164 C1 * | 10/2008 |
| WO | 2017055637 | 4/2017 |

OTHER PUBLICATIONS

Machine translations of JP-2013215830-A, Mar. 2023 (Year: 2025).*
Machine translation of CN-115055814-A, Mar. 2025 (Year: 2025).*
Extended European Search Report in counterpart EP 23206896.5 dated Apr. 8, 2024 (7 pages).

* cited by examiner

MACHINING DEVICE WITH A MEASURING SYSTEM

TECHNICAL FIELD

The present invention relates to a machining device with a measuring system, in particular to a machining device with multiple translational and/or rotary machine axes for laser processing, grinding or electrical discharge machining a workpiece into a target tool.

BACKGROUND OF THE INVENTION

Machining devices, particularly grinding machines, laser processing machines or electrical discharge processing machines for turning a workpiece into a tool are well known. Known machining devices, for example grinding devices, are comprising at least two, preferably three, four or even five mechanical machine axes including rotary machine axes and/or translational machine axes for moving the workpiece and the grinding tool relative to each other under control of a programmable control unit. In general the grinding device comprises a first rotary machine axis and a second rotary machine axis, perpendicular to and rotating about the first rotary machine axis and in some cases a further rotary machine axis. The translational machine axes of the machining device can be referred as X-, Y-, and/or Z-axis.

Known laser machining devices comprise at least one optical axis to position and/or move the laser beam by means of a laser system, for example a scanner unit and mechanical machine axes to provide relative movement between the scanner unit and the workpiece. The scanner unit might be configured to move the focal point of the laser beam to provide a largely free, three-dimensional orientation of the impingement point and/or focal point of the laser beam onto the workpiece and hence on the machining or ablation space.

Known electrical discharge machining (EDM) devices create current discharges between a tool-electrode and the workpiece to machine, separated by a dielectric fluid. As tool electrodes typically wires or rotating conductive wheels can be used.

Machining devices can comprise at least two, preferably three, four or even five mechanical axes, including rotary and/or translational machine axes, for moving the workpiece and the tool electrode relative to each other under the control of a programmable control unit. In general, EDM devices comprise a first rotary machine axis and a second rotary machine axis, perpendicular to and rotating about the first rotary machine axis and in some cases a further rotary machine axis. Translational machine axes can be referred as X-, Y-, and/or Z-axis.

These machining devices comprise at least a holding and/or clamping device for receiving the workpiece to be machined and at least one tool unit provided to act on the workpiece to perform the desired task. In context with this invention, the machine unit can be a grinding unit, for example a cup-shaped grinding wheel, or alternatively a laser system used in conjunction with an optical system to direct the laser beam onto and move it across a workpiece surface or an electrode unit for generating electrical discharge.

Known machining devices may comprise a measuring system that is arranged for an in-process measuring of the workpiece. Measuring methods are either with contact or contact free depending on the measuring means. For example, a measuring system performing measurements by contact may comprise as measuring means a tactile probe. Contact free measuring systems may comprise an optical sensor or an inductive sensor. Measuring means can be designed as a contact-sensitive probe, a remote-scanning probe, a laser-scanning probe, a probe that uses light beam or a probe configured as electrostatically-responsive.

Well known is a tactile probe configured as touch trigger probe comprising a protruding stylus with a distal sensing end as a measuring tip. In some known machining devices the touch trigger probe is moved by means of the machine axes relative to the workpiece along at least one translational direction and is brought into contact with the to-be measured workpiece. The sensing end is deflected, the deflection is determined by corresponding means and in the instant of contact, the touch trigger probe generates a trigger signal transmitted to the machine device. The transmitted trigger signal initiates a stop of the machine axis to which the probe is attached or freezes outputs of readout heads of a coordinate measuring device. The instantaneous position values can be determined, and this information can be used for adapting the further processing. In this case, the touch trigger probe simply acts as a switch and is not movable independently from the machine axes. This type of touch trigger probe is not appropriate for high precision measurements as well as high speed measuring processes since it suffers from a time delay between the actual trigger event and the issuance of the signal. The variability in the time delay is not easy to compensate. Further, the accuracy of measurements may be degraded by thermal effects due to operation of the machining device itself or by uncontrolled thermal environment. Another disadvantage of this measuring system is that these touch trigger probes are not independent movable from the machine axes and do not possess an independent position coordinate system.

Another known measuring system uses a tactile measuring probe movable independently from the machining device by a linear axis with an internal measuring unit for measuring position values in the direction of the linear axis in a separate coordinate system. After repositioning of the workpiece another measuring point can be approached. Therefore, measurements in only one direction are possible, measurements in different directions require repositioning of the workpiece. Another problem of this measuring system may be to control the force that the probe exercises on the workpiece surface due to contact. If the force is too high a workpiece surface or the probe may deform or be damaged by the contact. If the force is too low, a layer of dust or contamination on the workpiece surface may prevent the probe from fully contacting this measured workpiece surface resulting in incorrect measurements values.

DE 10 2012 110 673 describes a modular measuring device integrated in a grinding machine, in particular mounted on a tool unit movable along at least one feed axis with respect to the workpiece and comprising at least a toggle measurement head and a support piece which provides a plurality of defined predetermined locations for the toggle measurement head. The measuring device comprises a linkage mechanism permitting pivoting and translational movement of the toggle measurement head to bring it in measurement position and in an out-of-engagement position with respect to the workpiece. An actual position of the toggle measurement head is determined from the signals that are triggered by the toggle measurement head when touching the workpiece on the basis of an actual location of the tool unit which is movable in a plurality of directions or spatial axes. The positioning of the measurement head in a measurement position will introduce certain inaccuracy and some delay time in the system.

Therefore, an object of the invention is to provide a machining device with a measuring system to perform in-process measurements of a workpiece directly in the machining device and in the course of machining operation wherein the measuring system is adapted to perform measurements with high precision, repeatability, speed and in such manner as to prevent damaging of sensitive and/or brittle workpieces. Furthermore, the measuring system should be integrable in the machining device as an independent unit in a space saving manner and should be robust against thermal effects and contaminations.

Another object is to arrange the measuring system relative to the machining device in an optimized position, in particular as close as possible to a point of operation without intruding on the machining or working zone. Furthermore, the measuring system should have low inertia, so as not to interfere with rapid motion of moving members of the machining device, low weight, low vibrations, offering a large measurement range and high accuracy.

SUMMARY OF THE INVENTION

According to an aspect of the present invention, there is provided a machining device with multiple translational and/or rotary machine axes for laser processing, grinding or electrical discharge machining of a workpiece into a tool, comprising:
- a machining unit, either comprising a laser system with an optical system for generating, directing and/or moving a laser beam along an optical axis, a grinding tool rotatable around a tool axis, or an electrode tool for generating electrical discharge,
- a workpiece support on which the workpiece is attached, and wherein the workpiece support is arranged movable about a second rotary machine axis, which second rotary machine axis is movable relative to a first rotary machine axis, perpendicular to the second rotary machine axis,
- a measuring system positioned in a center of the first rotary machine axis and orientated towards a machine zero point, defined by an intersection of the first rotary machine axis and the second rotary machine axis, wherein the measurement system is configured to perform measurements along a first measurement axis and/or a second measurement axis to determine measurement data, and
- a control unit configured to control the machining device and/or the measuring system.

According to an aspect of the invention the machining device is used to turn a workpiece into a tool, preferably a cutting tool such as drilling or milling tool, cutting insert such as indexable insert in varying designs and geometries. Manufacturing the tool may include successive processing of the workpiece in different machining steps such as lasering, grinding, electrical discharge machining (EDM) and/or other suitable processing in one or multiple machining devices.

In general, the machining device comprises a tool unit such as a grinding tool, a scanner unit or a tool electrode, and a workpiece unit, which are movable relative to each other along or about mechanical machine axes to perform the processing.

The machining device according to the invention is configured as a multiple axes machining device including the workpiece support for positioning the workpiece in a precise and repeatable manner in relation to the tool unit such as a grinding wheel, a laser unit, and/or tool electrode.

The workpiece is received in and is positioned by the workpiece support, hereinafter mentioned as well as holder. The workpiece is at least movable about the second rotary machine axis and about the first rotary machine axis. The holder can be configured to clamp the tool in-between two anvils such that the clamping motion is colinear with the second rotary machine axis. Alternatively, the holder is configured to grip the workpiece such that the clamping motion is perpendicular to the second rotary machine axis. Furthermore, the workpiece can be held in the holder by vacuum or magnetic force. Further, the holder can be configured as a chuck, in particular a collet, a hydraulic chuck or any other chuck, mounted on the second rotary machine axis. Alternatively, the holder comprises a machine taper such as HSK to accept the workpiece.

According to the invention, the machining device comprises a measuring system performing in-processing measurements. The in-processing measurements of the supported and positioned workpiece may include determining position, orientation, and/or further characteristic values of the workpiece such as shape, contour, and/or dimensions before machining, in intermediate states of the machining process and/or of the finished tool. The performance of the machining device can be improved based on the measurement values determined by the measuring system with high accuracy. Furthermore, special signal-processing algorithms can be used to determine characteristic values of the workpiece.

Before machining, the measurement values may be used for adjusting the machining of the workpiece, in particular adjusting the machining program relative to the measured position and orientation of the workpiece. This adjustment can be based on measurements of dimension, position, and/or orientation of the supported workpiece, for example a cutting insert. With this adjustment a clamping error can be compensated. In the case of machining of a cylindrical workpiece the adjustment can be based on position, wobble and/or runout error of this supported workpiece.

The machining device further comprises the control unit for controlling the machining device and/or the measuring system. In one embodiment the control unit controls the motion of the measurement system and may control a force that a probe exercises on the workpiece surface by contact while measuring and/or scanning the workpiece.

According to the invention, the measuring system is positioned in a center of the first rotary machine axis and is orientated towards a machine zero point. The machine zero point is defined as the intersection point of the first rotary machine axis and the second rotary machine axis. The machine zero point is a defined characteristic value of the machining device. The machine zero point can be seen as a reference point of a spatial coordinate system, for example the coordinate reference point of the machining device assigned to the workpiece. Advantageously, the workpiece is machined in a region as close to the machine zero point as possible. The arranged measuring system is therefore orientated towards and is positioned near to a to-be measured plane or surface of the workpiece, such that for moving the measuring system from the rest position into a measuring position, preferably along the first measurement axis and/or the second measurement axis, are short paths.

According to a preferred embodiment the measuring system comprises a probe with a measuring tip movable at least in a measuring position, a rest position and/or a reference position. The measuring system comprises a first linear axis and a second linear axis perpendicular to the first linear axis. The first linear axis and the second linear axis are configured to move the probe along the first measurement axis and the second measurement axis, respectively. The measurement system further comprises a positioning system to detect the position of the measuring tip. Preferably, the positioning system comprises for each linear axis at least one encoder for detecting the position of the measuring tip in a corresponding coordinate axis.

In general a linear axis comprises at least an actuator with a driven member, which is movable into any determined position. According to one embodiment, the probe is a rigid touch probe and is movable in a force-controlled manner along the first linear axis and the second linear axis. The associated probe may be moved towards the workpiece until a determined probing force value is equal or above a predetermined value. Not only force values can be determined but as well other types of values can be used for controlling the motion of the measuring system. These values might be a detectable increase of probing force and/or a velocity of probing force increase. The detectable values can be set in relation to predeterminable threshold values. These threshold values can be set by a user and can be stored in the control unit. The measuring system comprising the first linear axis and the second linear axis allows high accuracy and precision measurements as well as controllable force to avoid harsh contact of the probe with delicate workpiece surfaces or areas.

Each of the linear axes representing measurement axes may be electrically powered by an electrical motor. Advantageously, control of the electric motor is relatively simple.

The first linear axis and the second linear axis for translational movement of the probe along the first measurement axis and the second measurement axis, respectively, allow length measurements or detecting coordinate values which can be processed based on algorithms into probe position information and thus into characteristic values of the workpiece. Measured dimensions and/or surface shapes of the workpiece can be used for a closed-loop feedback control of at least one of the linear axes to coordinate the measuring system.

Alternatively, the probe of the measuring system is configured as a touch trigger probe with a measuring tip, the sensing end, configured as a ball tip and is movable along the first linear axis and the second linear axis until the trigger is activated by contact with the workpiece. Therefore, the contact thereof with a surface of the workpiece is transduced into electrical signals, the movement is stopped, and an actual contact point coordinate value is determined. Preferably, the touch trigger probe can be scanned across an area or along a line on the workpiece such that more characteristic values of the workpiece are determinable.

The touch trigger probe has only two types of signal response, signaling contact or non-contact states of the measuring tip, preferably designed as a ruby sphere, and arranged at the distal end of a stylus or structure of the touch trigger probe.

A known touch trigger probe induces an elastic deformation of the structure of such touch trigger probe by contact of the measuring tip with the workpiece due to probing force. The amount of the elastic deformation of the structure is measured and can be used by the control unit.

Another type of a touch trigger probe comprises a vibrated measuring-point such that changes in vibration characteristic due to contact with the measured object is detected.

Each deformation of the structure or each changes of vibration characteristic are transduced into electrical signals. These signals are transmittable to the control unit to record the instantaneous position of the first linear axis and the second linear axis to calculate the coordinates of the contact point on the workpiece.

For the measurements with the touch trigger probe the velocity of the motion of the probe as well as the probing force are relevant parameters. The velocity should be equal or under a certain value to avoid discrepancies between the coordinates determined from the contact-detecting signal and the actual coordinates of the measuring tip. The probing force is known to be relevant in respect to repeatability of the measurements, accuracy of the determined contact point coordinate and/or of pressure exerted by the sensing end of the probe to the measured surface which can cause deformation of or damage to this workpiece surface. The probing force is typically given by the probe design and is fixed. Therefore, measurements based on controlled and predetermined probing force thanks to controllable linear axes improve the measurement efficiency and accuracy. Due to the high precise linear axes the measuring system performs measurements free from backlash, with high dynamics, with low maintenance and with forces adjustable to the measuring task.

In a further embodiment the measuring system comprises an additional third linear axis extending perpendicular to the first linear axis and perpendicular to the second linear axis to provide a further adjusting direction of the measuring system. This third linear axis can be configured as a third measurement axis and preferably as a force-controlled measurement axis. In the case that the first measurement axis and the second measurement axis lie in the X-Y-plane, the third linear axis or the third measurement axis represents the Z-coordinate direction.

Providing this third measurement axis allows displacing the measuring point of the probe along one further direction and therefore allows measurements in 3-D. Adjusting the position of the probe in at least one further direction allows 3D measurements of surfaces of the workpiece, which corresponds to measurements using a 3D probe.

The arrangement of the measuring system in the machining device, in which it is positioned in the center of the first rotary machine axis, known as the second last machine axis of the machining device, and with an orientation towards the machine zero point, minimizes thermal effects and/or effects of contamination in the measuring area. Thermal effects as well as contaminations are known to have negative impact on the accuracy and precision of measurement values. According to the invention the measuring system is configured to minimize these effects inter alia due to short displacement paths.

Furthermore according to arrangement and motion of the measurement system, the probe can be in a version with a short length and small diameter to reduce the total weight of the probe and to enhance precision of motion. The measurement values are determinable by avoiding systematic errors such as due to pre-travel variation, by reducing the travelling way of the linear axes and by shortening measurement time to minimize disturbing dynamic effects.

In another embodiment the measuring system comprises instead of a touch probe a contactless sensor probe arranged at the first linear axis, known as the first measurement axis. Such non-contact probe could be configured as an optical sensor and/or induction sensor. According to the arrangement of the first linear axis and the second linear axis the contactless sensor probe is movable towards and along the surface of the workpiece but does not enter in contact with it.

According to another embodiment, the machining device can comprise a camera unit to generate images of the workpiece. Preferably, the camera unit may be accommodated fixedly in the center of the first rotary machine axis and is orientated towards the supported workpiece. The camera unit comprises a camera, focusable optics, and/or lighting means, whereby the lighting means might be provided on the side of the camera or on the opposite side of the camera.

According to another embodiment, the machining device comprises a further camera provided to generate images of the workpiece. Preferably, this further camera can be part of the laser system in the case of a laser machining device. The image data can be used for further information. Data from the measurement system and data from the further camera can be combined or complement each other.

According to another aspect, the measurement data can be used by the control unit to control the machining device. Based on the measurement data a machining program of the machining device can be modified by the control unit. For instance the machining position, orientation and even volume to be machined can be modified based on measurement data acquired prior to machining. Further measurement data acquired during machining can be used for closed loop control of the machining process. Further measurement data acquired after the machining process can serve for quality assessment and as input for closed loop control of the machining device for processing following parts. The control unit could either directly use algorithms to exploit the measurement data or send it to a process unit that will then use algorithms for further use of the data.

According to one embodiment, the measuring system may be designed as a separate unit which is arrangeable in the center of the first rotary machine axis, preferably in a space saving manner. Another advantage of such separate unit is that it can be replaced, upgraded, and/or serviced easily.

BRIEF DESCRIPTION OF THE DRAWINGS

For a more complete understanding of the invention and the advantages thereof, exemplary embodiments of the invention are explained in more detail in the following description with reference to the accompanying figures, in which like reference characters designate like parts and in which.

DETAILED DESCRIPTION OF A PREFERRED EMBODIMENT

The accompanying drawings are included to provide a further understanding of the present invention and are incorporated in and constitute a part of a specification. The figures illustrate particular embodiments of the invention and together with the description serve to explain the principles of the invention. Other embodiments of the invention and many of the attendant advantages of the invention will be readily appreciated, as they become better understood with reference to the following detailed description.

Figure 1:
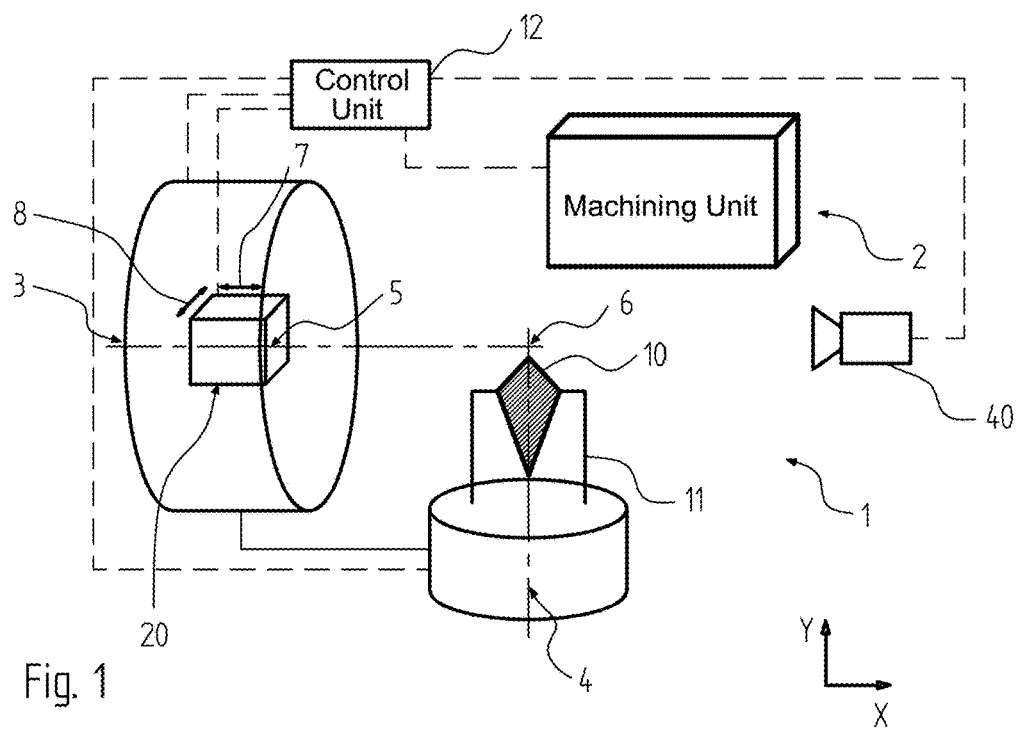
FIG. 1 is a schematic perspective view of a machining device with a machining unit comprising a machining tool.

Referring to FIG. 1 an embodiment of a machining device 1 is schematically shown comprising a machining unit 2 configured for machining a workpiece 10 into a tool. The machining unit 2 may comprise a grinding tool such as a cup-shaped grinding wheel. Other embodiments of the machining unit 2 can comprise a laser system or an electrical discharge unit depending on the machining process.

The machining device 1 is configured as a multiple-axes-device with at least a first rotary machine axis 3 and a second rotary machine axis 4, perpendicular to the first rotary machine axis 3. The second rotary axis 4 is movable about the first rotary machine axis 3. Further to these rotary machine axes 3 and 4, the machining device 1 includes translational axes (not shown) for moving the workpiece 10 supported in a workpiece support 11 and the machining unit 2 relative to each other under the control of a control unit 12. These translational axes extend preferably along the X-coordinate axis, the Y-coordinate axis, and/or the Z-coordinate axis. As can be schematically seen in FIG. 1, the machining device 1 comprises a measuring system 20 located in a center 5 of the first rotary machine axis 3. The measuring system 20 is provided to perform measurements on the supported workpiece 10 in at least a first measurement axis 7, in this embodiment along the X-coordinate axis and a second measurement axis 8 extending perpendicular to the first measurement axis 7. The measuring system 20 is arranged in the machining device 1 near a machine zero point 6. The machine zero point 6 is a virtual intersection point of the first rotary machine axis 3 and the second rotary machine axis 4. The machine zero point 6 creates a reference point of a spatial coordinate system, in particular the origin of the coordinate system of the machining device 1 assigned to the workpiece 10.

Schematically shown in FIG. 1 is a further camera 40 which can be provided to generate images of the workpiece 10 before, during and/or after machining for generating more data to verify the process of the machining of the workpiece 10. The further camera 40 can be part of the machining unit 2, in particular part of the laser system used for laser machining.

Figure 2:
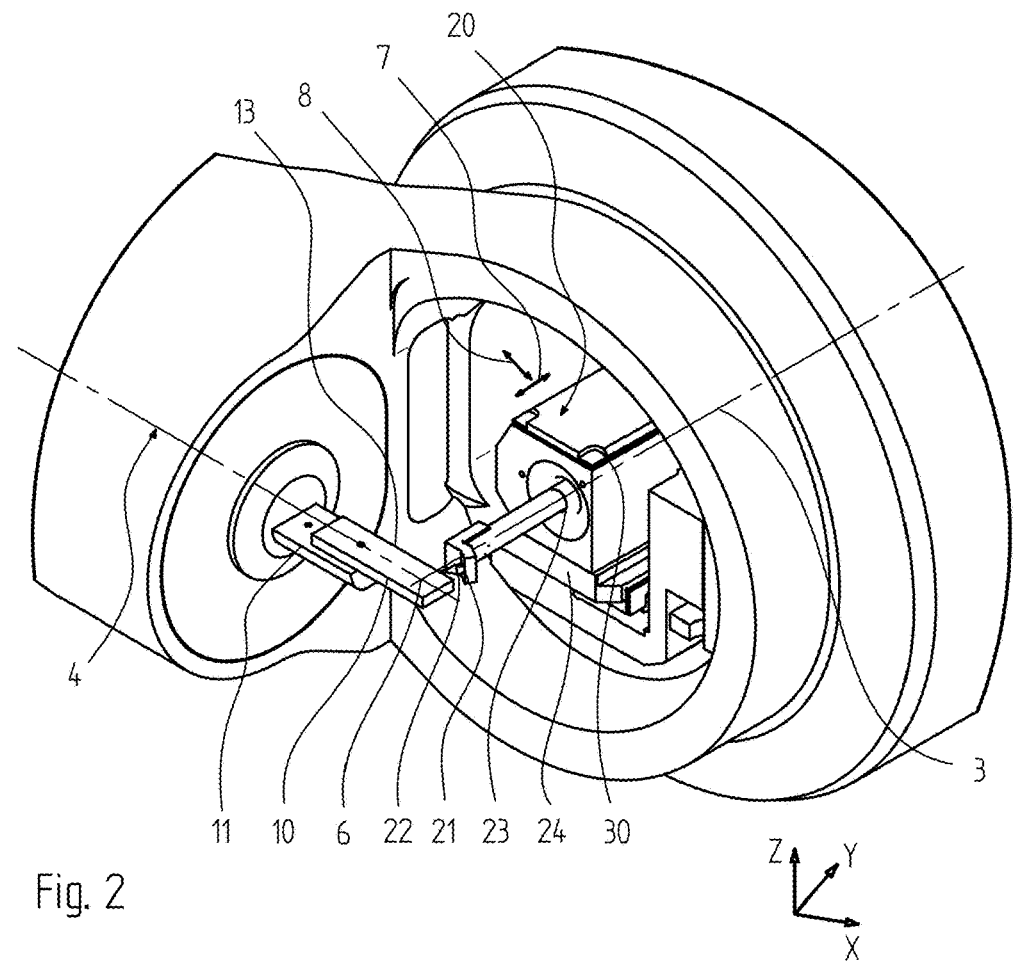
FIG. 2 is a schematic perspective view of a detail of the machining device with a measuring system.

FIG. 2 shows in detail a machining area within which machining processes on the workpiece 10 can be executed. The workpiece 10 is attachable on the workpiece support 11. The movable workpiece support 11 is arranged in the second rotary machine axis 4 and is configured to position the workpiece 10 for the processing. The workpiece support 11 can be described as a mobile assembly group of the machining device 1 to clamp and move the workpiece 10 with the help of the first rotary machine axis 3 and the second rotary machine axis 4, which are independent from each other. The workpiece support 11 can be configured as a clamping unit composed of a drive anvil and a clamping anvil or can be of any other suitable type.

According to the embodiment shown in FIG. 2 the workpiece support 11 is orientated coaxial with the second rotary axis 4.

Furthermore, a measuring system 20 is shown in FIG. 2 arranged in the center 5 (not shown) of the first rotary machine axis 3 and orientated towards the machine zero point 6.

As can be seen in FIG. 2 in this embodiment the measurement system 20 comprises a probe 21 with a measuring tip 22 extending coaxial to the first rotary machine axis 3 towards the machine zero point 6. According to the shown embodiment, the probe 21 is configured as a force-controlled touch probe and is movable by means of a first linear axis 23 and a second linear axis 24 perpendicular to the first linear axis 23. Therefore, the probe 21 can be moved from a rest position in a measurement position along the first measurement axis 7 and along the second measurement axis 8, depicted as arrows, into a reference position and/or any determinable position. With this arrangement of the measuring system 20 the measuring tip 22 of the probe 21 is positioned near to the to-be measured plane or surface 13 of the workpiece 10 such that only short travel paths are necessary to achieve contact of the measuring tip 22 with the surface 13 in the case of a touch probe 21.

The probe 21, in particular the measuring tip 22, is brought into contact with the workpiece surface 13 and/or can be moved along a measuring path on the surface 13 of the workpiece 10 lying in the plane determined by the first measurement axis 7 and the second measurement axis 8. The motion is preferably force controlled by means of the first linear axis 23 and the second linear axis 24. Controlling of the motion can be based on determinable force increase or velocity of force increase wherein the determined values are set into relation with predeterminable threshold values. At contact of the measuring tip 22 with the surface 13 of the workpiece 10 actual position coordinate values can be determined with a position system 30 of the measurement system 20 which can be further processed into characteristic values of the workpiece 10 or into data for controlling the adjustment of the workpiece 10 or controlling the machining process. The positioning system 30 can be configured as an encoder provided on the linear axis, in particular an encoder associated to the first linear axis 23 and another encoder associated to the second linear axis 24.

In another embodiment the probe 21 can be configured as a contactless sensor such as an optical sensor or an induction sensor. The measurements performed by the contactless sensor does not provide contact with the surface 13 of the workpiece 10 but can include movement of the contactless sensor towards the workpiece 10 to position the measuring tip 22 near the to-be measured workpiece surface 13, in particular in a predeterminable distance thereto.

In an alternative embodiment, the measuring system 20 comprises a camera unit 26 (shown in FIG. 4) which is fixedly mounted relative to the first rotary machine axis 3. The camera unit 26 comprises a camera, focusing optics and optionally illumination.

Figure 3:
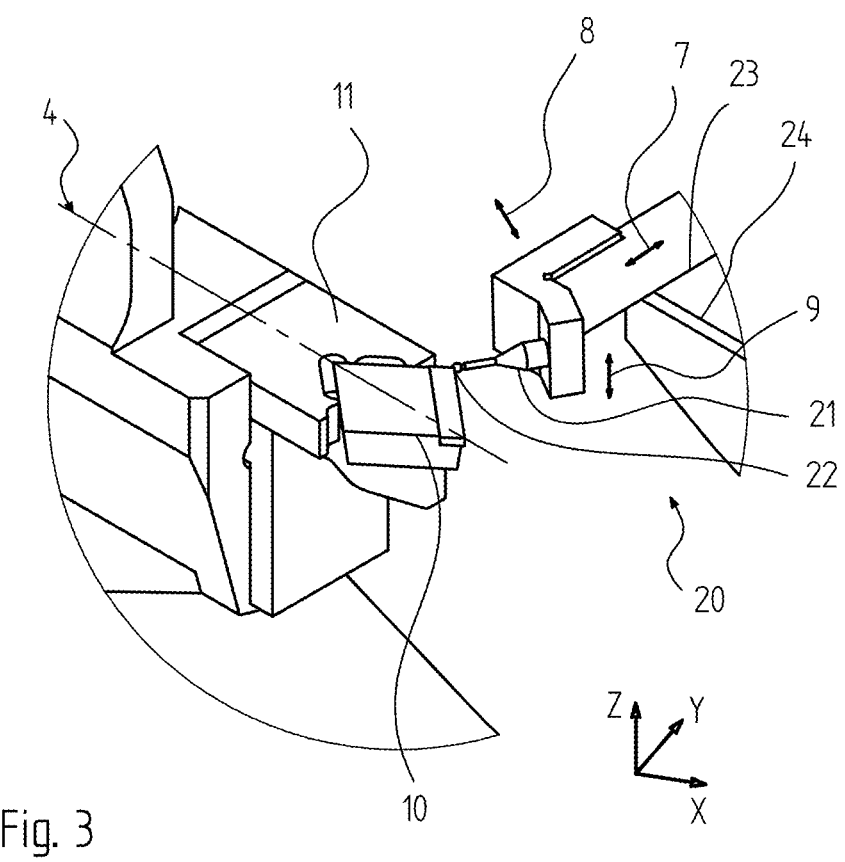
FIG. 3 is a schematic perspective view of a detail of the machining device with the measuring system.

In FIG. 3 a detail of the arrangement of the measurement system 20 in the machining device 1 is shown. The workpiece 10 is an indexable insert attached to the workpiece support 11 and extending from a center of the second rotary machine axis 4. The probe 21 with the measuring tip 22 is movable by means of the first linear axis 23 and the second linear axis 24. In particular, the first linear axis 23 is mounted on the second linear axis 24 such that the probe 21 attached to the first linear axis 23 is movable in two dimensions and in a controlled manner. The first measurement axis 7 extends along the moving path of the first linear axis 23 and the second measurement axis 8 extends along the movement path of the second linear axis 24. By moving the probe 21 in the plane defined by the first measurement axis 7 and the second measurement axis 8, in particular the X-Y-coordinate plane, the measuring tip 22 can move along defined paths on the surface 13 of the workpiece 10.

Furthermore, a third measurement axis 9 can be provided, in the shown embodiment extending along the Z-axis, such that the measuring tip 22 of the probe 21 can be moved in three dimensions, generating 3D-data of the workpiece 10.

Figure 4:
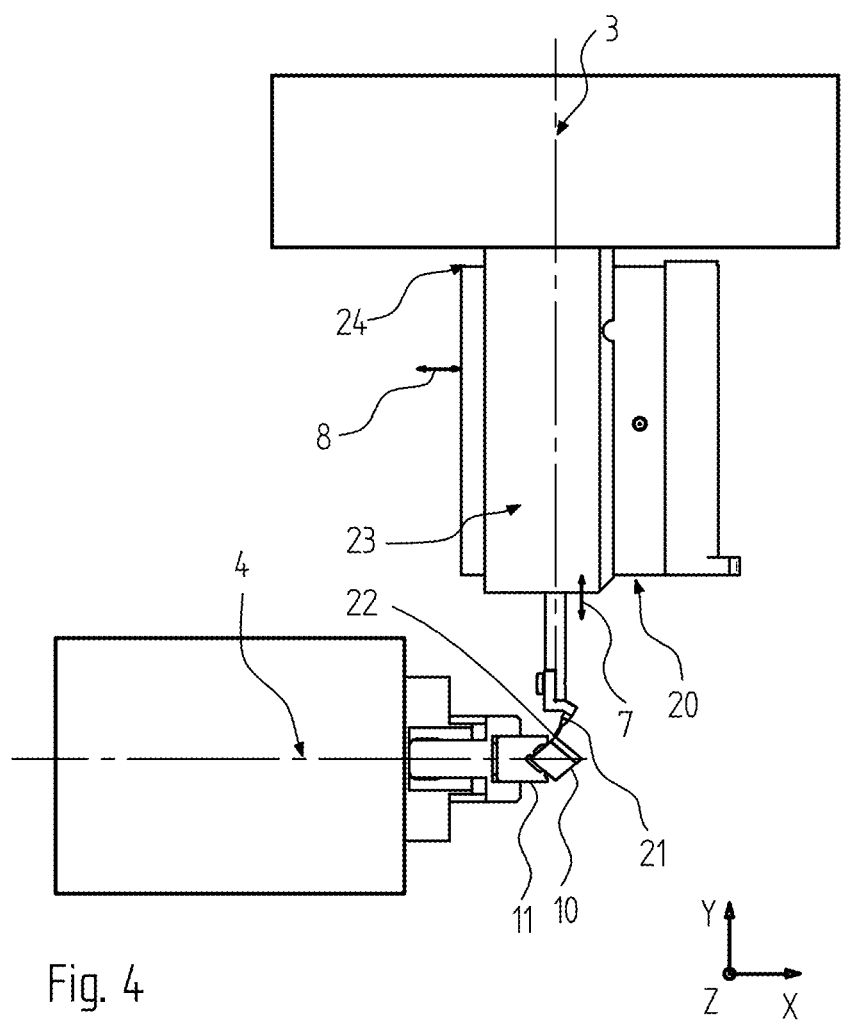
FIG. 4 is a schematic sectional view of the measuring system showing the first linear axis.

In FIG. 4 a top sectional view of the measurement system 20 is shown. According to FIG. 4 the first linear axis 23 is configured to move the attached probe 21 towards the workpiece 10, in particular along the first measurement axis 7 and in this case along the Y-coordinate axis. The second linear axis 24 is configured to move the probe 21 along the second measurement axis 8, perpendicular to the first measurement axis 7 and in this case along the X-coordinate axis.

The first linear axis 23 and the second linear axis 24 can each comprise an electrical motor to drive these linear axes 23, 24 in a controlled manner.

Not shown in FIG. 4 is a third measurement axis 9, perpendicular to the first measurement axis 7 and perpendicular to the second measurement axis 8 and in this case extending along the Z-coordinate axis.

Figure 5:
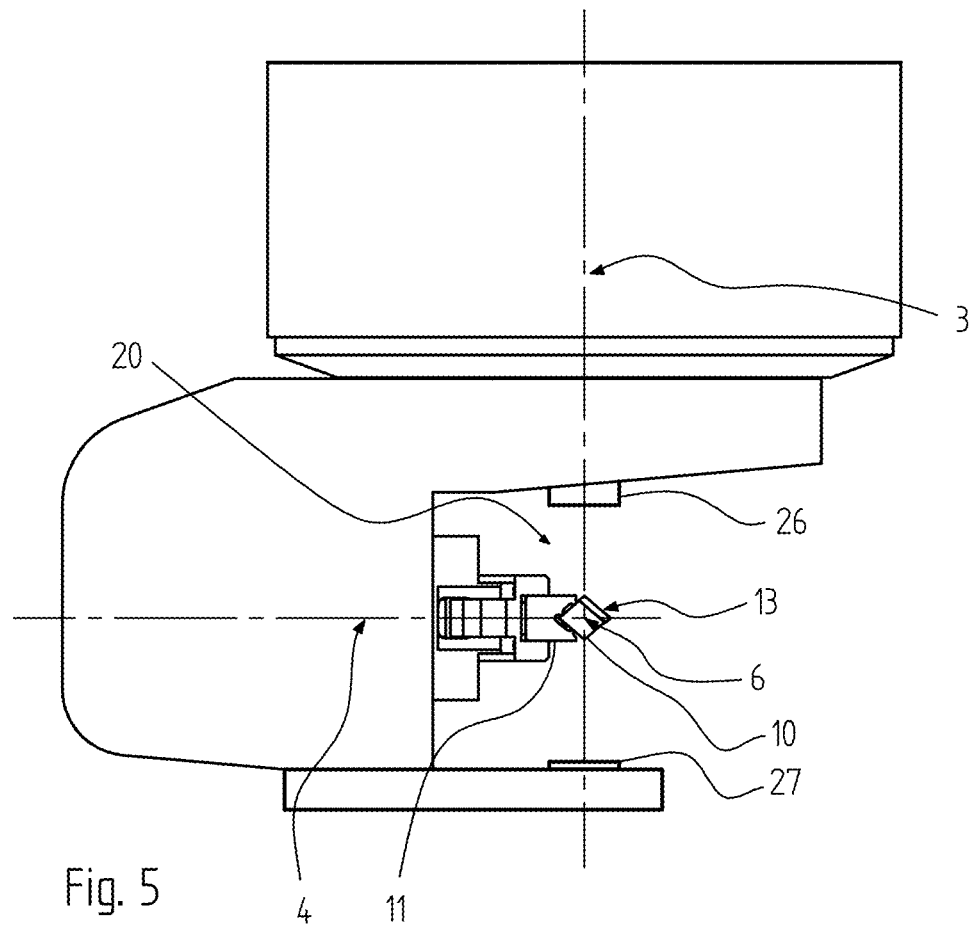
FIG. 5 is a schematic sectional view of an embodiment of the measuring system.

FIG. 5 shows another embodiment of the invention, in particular an arrangement of the measuring system 20 comprising a camera unit 26, fixedly arranged relative to the first rotary machine axis 3 and orientated towards the machine zero point 6. The camera unit 26 comprises a camera and optional illumination means 27, either provided on the same side with the camera or on the opposite side as shown in FIG. 5. Further, the camera unit 26 comprises focusable lens such that an image of the surface 13 of the workpiece 10 can be made which can be further processed.

While the invention has been described in detail with reference to specific embodiments thereof, it will be apparent to one skilled in the art that various changes and modification may be made, and equivalents thereof employed, without departing from the scope of the claims.

The invention claimed is:

1. A machining device with multiple translational and/or rotary machine axes for laser processing, grinding or electrical discharge machining of a workpiece into a tool, the machining device comprising:
   a machining unit comprising either a laser system with an optical system for generating, directing and/or moving a laser beam along an optical axis, a grinding tool rotatable around a tool axis, or an electrode tool for generating electrical discharge,
   a workpiece support on which the workpiece is attached, and wherein the workpiece support is arranged movable about a second rotary machine axis, which second rotary machine axis is movable relative to a first rotary machine axis perpendicular to the second rotary machine axis, and
   a measuring system positioned in a center of the first rotary machine axis and orientated towards a machine zero point defined by an intersection of the first rotary machine axis and the second rotary machine axis, wherein the measuring system is configured to perform measurements along a first measurement axis and/or a second measurement axis to determine measurement data.

2. The machining device according to claim 1, wherein the measuring system comprises:
   a probe with a measuring tip movable in a measuring position, a rest position and/or a reference position,
   a first linear axis arranged coaxial to the first rotary machine axis and a second linear axis, perpendicular to the first linear axis, wherein the first linear axis and the second linear axis are configured to move the probe along the first measurement axis and the second measurement axis, respectively and
   a positioning system to detect the position of the measuring tip.

3. The machining device according to claim 2, wherein the movement of the probe along the first linear axis and/or second linear axis is force controlled.

4. The machining device according to claim 3, wherein the force control along the first linear axis and/or the second linear axis is based on determined data such as probing force, increase of probing force and/or velocity of probing force increase, wherein a threshold value is predeterminable.

5. The machining device according to claim 2, wherein the probe is configured as a touch trigger probe which is programmed to generate a trigger signal signaling contact of the measuring tip with a workpiece surface.

6. The machining device according to claim 2, wherein the probe is configured as a contactless sensor probe, such as an optical sensor and/or induction sensor and is configured for contact-free measurement of the workpiece.

7. The machining device according to claim 1, wherein the measuring system comprises a third linear axis which extends perpendicular to the first linear axis and perpendicular to the second linear axis.

8. The machining device according to claim 7, wherein the third linear axis is a third measurement axis.

9. The machining device according to claim 2, wherein said probe has one said measuring tip.

10. The machining device according to claim 1, wherein the measuring system comprises a camera unit arranged fixedly in the center of the first rotary machine axis and comprising a camera, focusable optics and/or lighting means.

11. The machining device according to claim 10, wherein a further camera is provided in the machining device to generate images of the workpiece.

12. The machining device according to claim 11, wherein measurement data from the measuring system is combined with measurement data from the further camera.

13. The machining device according to claim 1, wherein the measuring system is configured as a separate unit which is arrangeable in the center of the first rotary machine axis.

* * * * *